US006546639B2

(12) United States Patent
Singer et al.

(10) Patent No.: US 6,546,639 B2
(45) Date of Patent: Apr. 15, 2003

(54) INCLINATION MEASUREMENT APPARATUS

(76) Inventors: Federico Singer, 35 Patrick La., Branford, CT (US) 06405; Yuval Singer, 86 Hatishbi Street, Haifa 34522 (IL)

( * ) Notice: Subject to any disclaimer, the term of this patent is extended or adjusted under 35 U.S.C. 154(b) by 0 days.

(21) Appl. No.: 09/916,438

(22) Filed: Jul. 30, 2001

(65) Prior Publication Data

US 2002/0092189 A1 Jul. 18, 2002

(30) Foreign Application Priority Data

Dec. 10, 2000 (IL) ................................................ 140206

(51) Int. Cl.[7] ................................................ G01C 9/12
(52) U.S. Cl. ......................... 33/391; 33/366.24; 33/397
(58) Field of Search ............................. 33/365, 366.11, 33/366.24, 366.25, 366.26, 391, 397, 401, 534, 536

(56) References Cited

U.S. PATENT DOCUMENTS 3,829,981 A 8/1974 Vlasblom
3,849,897 A 11/1974 Markakis et al.
RE28,694 E 1/1976 Markakis et al.
4,196,524 A * 4/1980 Bechtel .................. 33/366.26
4,528,760 A 7/1985 Plummer
4,680,867 A * 7/1987 Hufman et al. ............... 33/391
4,866,850 A 9/1989 Kelly et al.
4,943,158 A * 7/1990 Pertl et al. ............... 33/366.24
4,974,329 A * 12/1990 Willa .......................... 33/391
5,184,336 A * 2/1993 Wanger et al. ............... 33/1 M
5,210,954 A 5/1993 Schafler
5,317,810 A 6/1994 Isono et al.
5,365,671 A * 11/1994 Yaniger ....................... 33/365
5,575,073 A * 11/1996 von Wedemayer ........... 33/365
2002/0002777 A1 * 1/2002 Torr ............................ 33/534
2002/0053144 A1 * 5/2002 Matsumoto et al. .......... 33/391
2002/0073563 A1 * 6/2002 Toda et al. .............. 33/366.24

FOREIGN PATENT DOCUMENTS

FR 2640042 * 6/1990 .................. 33/391
JP 62096813 * 5/1987 .................. 33/391
JP 62129718 * 6/1987 .................. 33/365
JP 63015112 * 1/1988 .................. 33/365
JP 01136010 * 5/1989 .................. 33/365

* cited by examiner

*Primary Examiner*—Diego Gutierrez
*Assistant Examiner*—Travis Reis
(74) *Attorney, Agent, or Firm*—Nath & Associates PLLC; Harold L. Novick

(57) ABSTRACT

Inclination measurement apparatus for measuring the inclination of a surface to the horizontal. The apparatus includes (a) a base plate for mounting the apparatus on the surface; (b) a ball bearing with i) a housing washer rigidly mounted on the base plate, and having a flat upper bearing surface, ii) a ball and cage thrust assembly set on the upper bearing surface, and iii) a shaft washer having a flat lower bearing surface set on the ball and cage thrust assembly, and being rotatable thereon between a first pair of diametrically opposite orientations defining a first measurement axis on the horizontal to the local gravity vector prevailing at the location of the apparatus; and (c) a first clinometer mounted on the shaft washer for obtaining an inclination measurement in each of the first pair of diametrically opposite orientations whereby the true inclination of the surface to the horizontal along the first measurement axis is determinable from the difference between the pair of measurement inclinations.

10 Claims, 2 Drawing Sheets

INCLINATION MEASUREMENT APPARATUS

FIELD OF THE INVENTION

The invention relates to inclination measurement apparatus, and more particularly to an inclination measurement apparatus capable of highly accurate measurements to an accuracy in the order of $10^{-5}$°.

BACKGROUND OF THE INVENTION

Inclination measurement apparatus for highly sensitive applications including inter alia the setting up of and subsequent inclination monitoring of antennas, artillery, radar, telescopes, and the like, requiring ultra accurate inclination measurements may suffer from transient and aging biases leading to errors in the same order as the desired accuracy, or even greater. Inclination measurement apparatus are illustrated and described in U.S. Pat. Nos. 3,829,9871, 3,849, 897, RE 28,694, 4,528,760, 4,866,850, 5,210,954, and 5,317,810, and one known approach to negate transient biases arising from ambient temperature changes is to install inclination measurement apparatus within a so-called thermal blanket.

SUMMARY OF THE INVENTION

In accordance with the present invention, there is provided an inclination measurement apparatus for measuring the inclination of a surface to the horizontal, the apparatus comprising:

a) a base plate for mounting the apparatus on the surface;

b) a ball bearing including:

i. a housing washer rigidly mounted on said base plate, and having a flat upper bearing surface, ii. a ball and cage thrust assembly set on said upper bearing surface, and iii. a shaft washer having a flat lower bearing surface set on said ball and cage thrust assembly, and being rotatable thereon between a first pair of diametrically opposite orientations defining a first measurement axis on the horizontal to the local gravity vector prevailing at the location of the apparatus; and (c) a first clinometer mounted on said shaft washer for obtaining an inclination measurement at each of said pair of diametrically opposite orientations whereby the true inclination of the surface relative to the horizontal along said measurement axis is determinable from the difference between said pair of measurement inclinations.

By virtue of high manufacturing tolerances of its upper and lower bearing surfaces and its balls, the ball bearing demonstrates a high degree of parallelism between its lower and upper bearing surfaces, thereby facilitating the measuring of an inclination to the horizontal to an accuracy in the order of about $10^{-5}$°. In addition, the inclination measurement apparatus of the present invention is readily manufacturable both in terms of its relative small number of parts, and the ease of their assembly, and is particularly suitable for applications for which the degree of accuracy required increases the smaller the inclination relative to the horizontal to be measured.

BRIEF DESCRIPTION OF THE DRAWINGS

In order to understand the invention and to see how it can be carried out in practice, a preferred embodiment will now be described, by way of a non-limiting example only, with reference to the accompanying drawings, in which similar parts are likewise numbered, and in which.

DETAILED DESCRIPTION OF THE DRAWINGS

Figure 1:
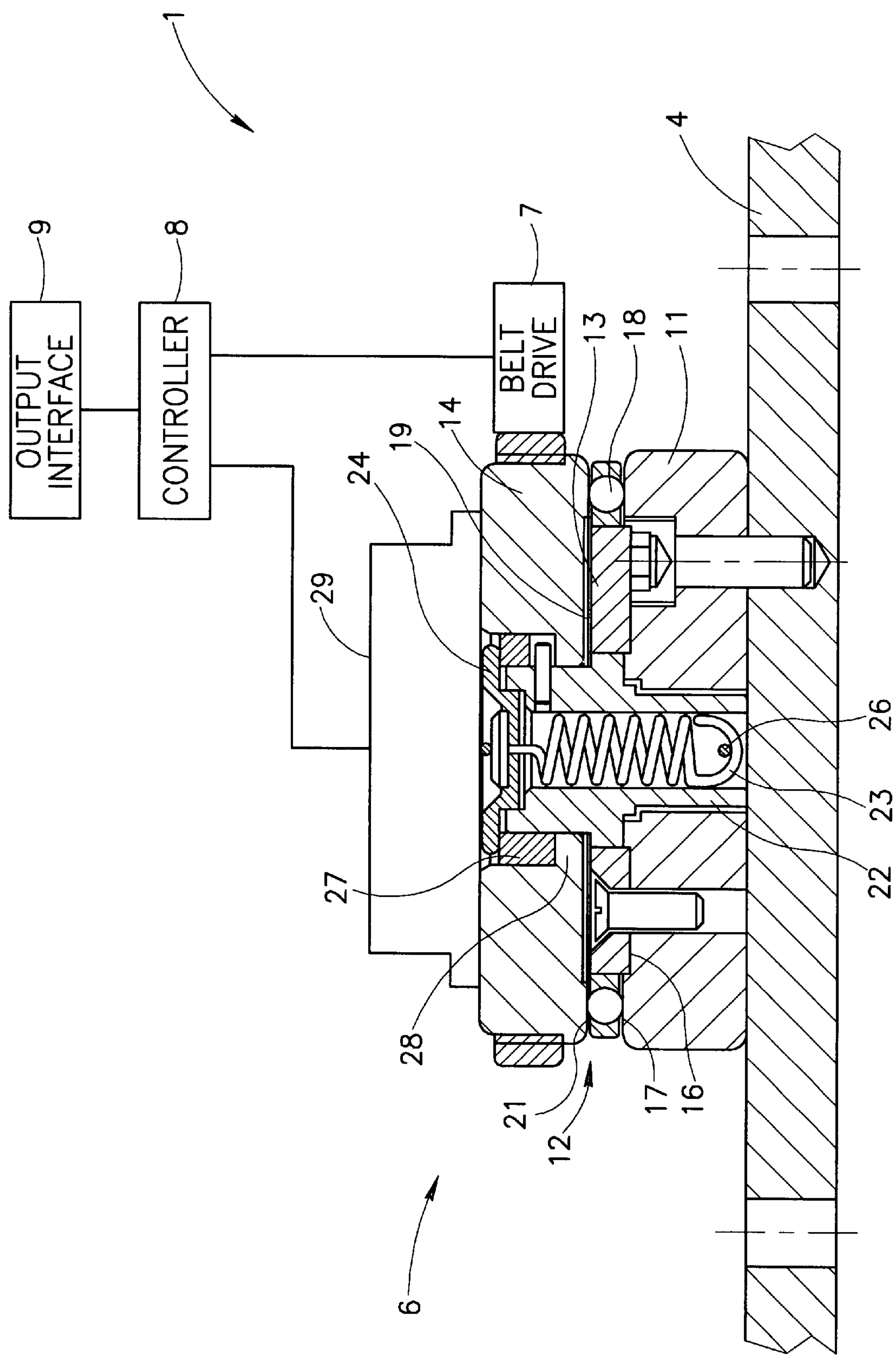
FIG. 1 is a schematic representation of inclination measurement apparatus in accordance with the present invention shown in cross section.
Figure 2A:
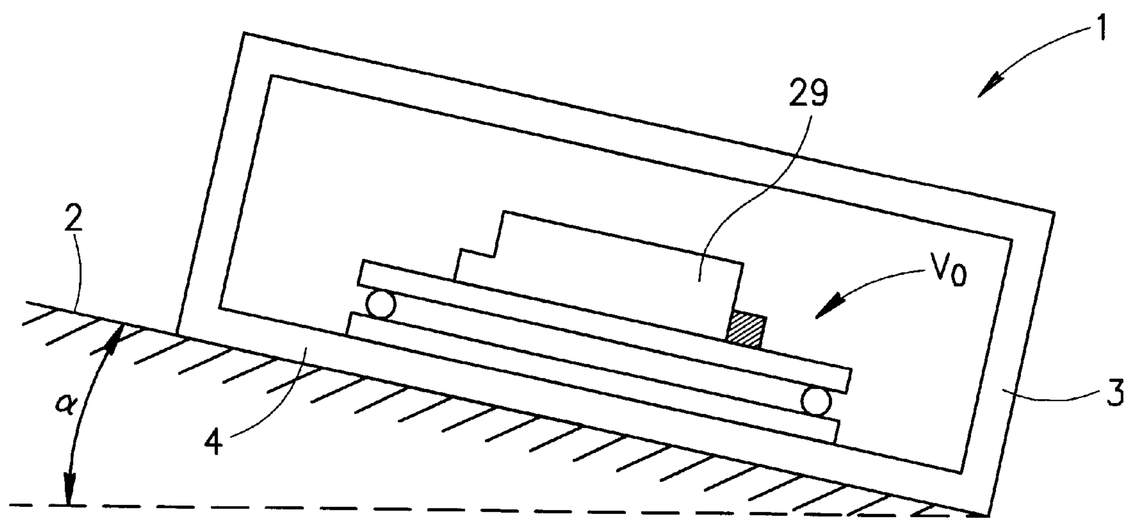
FIGS. 2A and 2B show the use of the apparatus of FIG. 1.
Figure 2B:
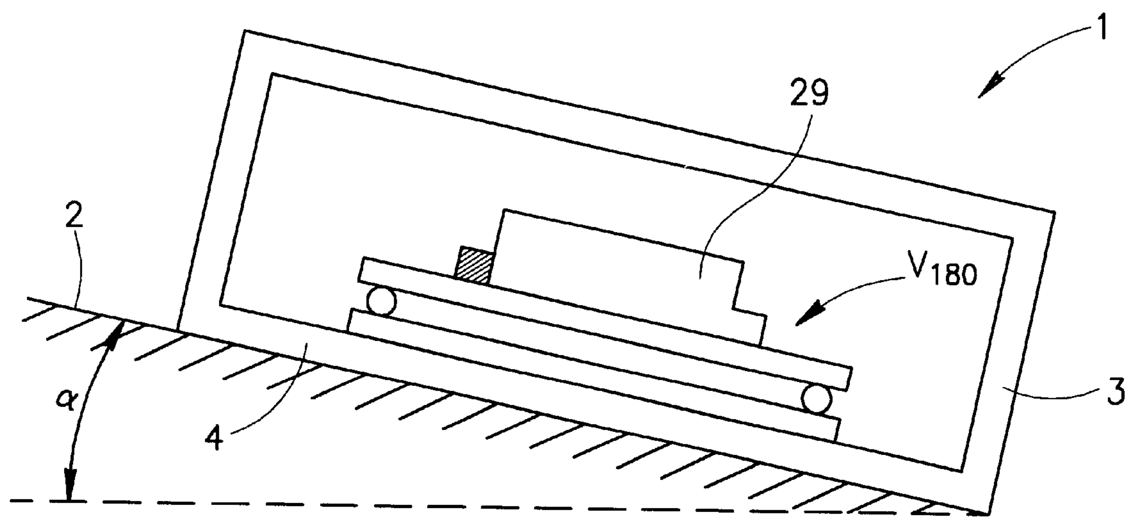

FIGS. 1 and 2 show inclination measurement apparatus 1 mounted on a surface 2 whose inclination to the horizontal is to be measured. The apparatus 1 includes a housing 3 having a base plate 4 for screw fastening to the surface 2, and accommodating a ball bearing 6, a belt drive 7, a controller 8, and an output interface 9, for example, RS-232.

The ball bearing 6 includes a housing washer 11 rigidly mounted on the base plate 4, a ball and cage thrust assembly 12, an annular spacer 13, and a shaft washer 14. The housing washer 21 has an upper surface 16 including a laterally outermost flat upper bearing surface 17. The ball and cage thrust assembly 12 is mounted exterior to the spacer 13, and typically contains about thirty balls 18. The shaft washer 14 has a lower surface 19 with a laterally outermost flat lower bearing surface 21 fully bearing on the uppermost surfaces of the balls 18 whose lowermost surfaces fully bear the shaft washer 14. The upper and lower bearing surfaces 17 and 21 have a flatness tolerance of about $10^{-2}$ $\mu$m, and the balls 18 have a spherical tolerance of about $10^{-2}$ $\mu$m, whereby the bearing surfaces 17 and 21 are highly parallel, and are also highly parallel to the measured surface 2.

A centrally mounted tubular sleeve 22 is seated within the ball bearing 6 for receiving a tension spring 23 (constituting an external compression means) extending between a closure plate 24 and an anchor point 26 located adjacent the base plate 4. The tension spring 23 positively urges the closure plate 24 against another spacer ring 27 which in turn positively urges against an innermost shoulder 28 of the shaft washer 14 for ensuring intimate contact between the bearing surfaces 17 and 21 and the ball and cage thrust assembly 12 despite ambient temperatures changes, and the like which may otherwise affect the precise arrangement of the ball bearing 6.

A clinometer 29 is set on the shaft washer 14 for measuring the inclination $\alpha$ of the surface 2 relative to the horizontal in each of two diametrically opposite orientations respectively denoted $V_0$ and $V_{180}$ (see FIGS. 2A and 2B) defining therebetween a measurement axis on the horizontal to the local gravity vector at the location of the apparatus 1. The controller 8 controls the belt drive 7 for driving the shaft washer 14 between the two diametrically opposite orientations delimited by limit switches (not shown) whereupon the shaft washer 14 slidingly rotates about the spacer ring 27 which remains stationary.

The automatic operation of the inclination measurement apparatus 1 for measuring the inclination $\alpha$ of the surface 2 relative to the horizontal along the measurement axis is as follows: The controller 8 sets the ball bearing 6 to its first orientation $V_0$ (see FIG. 2A) for obtaining a first inclination measurement thereat. Thereafter, the controller 8 rotates the ball bearing 6 to its second orientation $V_{180}$ (see FIG. 2B) for obtaining a second inclination measurement thereat. The controller 8 determines the true inclination $\alpha$ of the surface 2 relative to the horizontal along the measurement axis as follows:

$$V_{real} = \frac{V_0 - V_{180}}{2}$$

where $V_{real}$ corresponds to the true inclination α, namely, the inclination unaffected by the bias of the clinometer 29, if any.

The inclination measurement apparatus 1 can be adapted for measuring the inclination of the surface relative to the horizontal along two mutually perpendicular measurement axes. This can be achieved in one of two ways: First, by providing a second clinometer perpendicularly oriented to the first clinometer whereby the apparatus can simultaneously measure the inclination of the surface relative to the horizontal along the two mutually perpendicular measurement axes. And second, by rotating the first clinometer between a second pair of diametrically opposite orientations perpendicular to the first pair of diametrically opposite orientations whereby the apparatus is capable of consecutively measuring the inclination of the surface relative to the horizontal along the two mutually perpendicular measurement axes.

While the invention has been described with respect to a limited number of embodiments, it will be appreciated that many variations, modifications, and other applications of the invention can be made within the scope of the appended claims. For example, a degenerate version of the inclination measurement apparatus 1 can include a clinometer directly outputting its readings for external determination of an inclination, and/or a manually rotated ball bearing.

What is claimed is:

1. Inclination measurement apparatus for measuring the inclination of a surface to the horizontal, the apparatus comprising:

(a) a base plate for mounting the apparatus on the surface;

(b) a ball bearing including:

(i) a housing washer rigidly mounted on said base plate, and having a flat circular, continuous upper bearing surface, (ii) a ball and cage thrust assembly having a plurality of balls each set on said upper bearing surface, and (iii) a shaft washer having a flat circular, continuous lower bearing surface continuously set on said balls, and being rotatable thereon between a first pair of diametrically opposite orientations defining a first measurement axis on the horizontal to the local gravity vector prevailing at the location of the apparatus; and (c) a first clinometer mounted on said shaft washer for obtaining an inclination measurement at each of said first pair of diametrically opposite orientations whereupon the true inclination of the surface relative to the horizontal along said first measurement axis is determinable from the difference between said first pair of inclination measurements.

2. Apparatus according to claim 1 wherein said upper and lower bearing surfaces are lapped to a flatness tolerance of about $10^{-2}$ μm.

3. Apparatus according to claim 1 wherein said ball and cage thrust assembly accommodates a plurality of balls having a spherical tolerance of about $10^{-2}$ μm.

4. Apparatus according to claim 1 and further comprising an external compression means for positively urging said shaft washer towards said housing washer.

5. Apparatus according to claim 4 wherein a tension spring constitutes said external compression means.

6. Apparatus according to claim 1 and further comprising a controller for effecting rotation of said shaft washer between said first pair of diametrically opposite orientations.

7. Apparatus according to claim 6 wherein said controller controls a belt drive for effecting rotation of said shaft washer.

8. Apparatus according to claim 1 and further comprising a second clinometer perpendicularly oriented to said first clinometer whereby, on rotation of said shaft washer between said first pair of diametrically opposite orientations, the apparatus is capable of simultaneously measuring the inclination of the surface relative to said horizontal along two mutually perpendicular measurement axes.

9. Apparatus according to claim 1 wherein said first clinometer is rotatable between a second pair of diametrically opposite orientations perpendicular to said first pair of diametrically opposite orientations whereby the apparatus is capable of measuring the inclination of the surface relative to the horizontal along two mutually perpendicular measurement axes.

10. Apparatus according to claim 1 wherein said first clinometer is a dual axis clinometer whereby, on rotation of said shaft washer between said first pair of diametrically opposite orientations, the apparatus is capable of simultaneously measuring the inclination of the surface relative to said horizontal along two mutually perpendicular measurements axes.

* * * * *

UNITED STATES PATENT AND TRADEMARK OFFICE

CERTIFICATE OF CORRECTION

PATENT NO. : 6,546,639 B1
DATED : May 20, 2003
INVENTOR(S) : Masakazu Hatanaka et al.

It is certified that error appears in the above-identified patent and that said Letters Patent is hereby corrected as shown below:

Title page, Item [54] and Column 1, line 1,
Title, change "ANGULAR SPEED SENSOR" to -- ANGULAR RATE SENSOR --

Column 10,
Line 18, delete "." after "rate".
Line 21, after "of" and before "different" please insert space.

Signed and Sealed this

Sixth Day of April, 2004

JON W. DUDAS
*Acting Director of the United States Patent and Trademark Office*